US008391371B2

(12) United States Patent
Klein Middelink et al.

(10) Patent No.: US 8,391,371 B2
(45) Date of Patent: Mar. 5, 2013

(54) EMBEDDED DATA SIGNALING

(75) Inventors: Marc Willem Theodorus Klein Middelink, Eindhoven (NL); Jan Van Der Meer, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 2022 days.

(21) Appl. No.: 10/531,929

(22) PCT Filed: Oct. 20, 2003

(86) PCT No.: PCT/IB03/04620

§ 371 (c)(1), (2), (4) Date: Apr. 19, 2005

(87) PCT Pub. No.: WO2004/039127

PCT Pub. Date: May 6, 2004

(65) Prior Publication Data

US 2006/0015926 A1 Jan. 19, 2006

(30) Foreign Application Priority Data

Oct. 22, 2002 (EP) .................................... 02079427

(51) Int. Cl.
*H04N 7/18* (2006.01)

(52) U.S. Cl. .............................. 375/240.25; 375/240.01

(58) Field of Classification Search . 375/240.01–240.29
See application file for complete search history.

(56) References Cited

U.S. PATENT DOCUMENTS

| | | | | |
|---|---|---|---|---|
| 5,592,398 | A * | 1/1997 | Terauchi et al. | 370/535 |
| 5,619,384 | A | 4/1997 | Leonhardt et al. | |
| 6,708,145 | B1 * | 3/2004 | Liljeryd et al. | 704/200.1 |
| 6,907,070 | B2 * | 6/2005 | Wu et al. | 375/240.12 |
| 7,039,116 | B1 * | 5/2006 | Zhang et al. | 375/240.26 |
| 7,340,762 | B2 * | 3/2008 | Kim | 725/58 |

FOREIGN PATENT DOCUMENTS

| | | | |
|---|---|---|---|
| EP | 0993200 | A2 | 4/2000 |
| EP | 0993200 | A3 | 11/2001 |
| EP | 1154650 | A2 | 11/2001 |
| EP | 1213912 | A2 | 6/2002 |
| JP | 11317672 | A | 11/1999 |
| JP | 2000339852 | | 12/2000 |
| JP | 2002082610 | A | 3/2002 |
| WO | WO 01/74085 | A2 | 10/2001 |

OTHER PUBLICATIONS

Faller et al: “Binaural Cue Coding Applied to Stereo and Multi-Channel Audio Compression”; AES Convention Paper, 112th Convention, May 2002, Munich, Germany, 9 Page Document.
Kikuchi et al: IETF RFC 3016: “RTP Payload Format for MPEG-4 Audio/Visual Streams”, Nov. 2000, 21 Page Document.

* cited by examiner

*Primary Examiner* — Andy Rao

(57) ABSTRACT

The invention provides main data (MD) which includes embedded data (ED), the data being provided with a main data descriptor (MDD) for signaling a content included in the main data, wherein an embedded data descriptor (EDD) is formed for signaling content included in the embedded data and wherein the embedded data descriptor is provided outside the main data and the main data descriptor.

16 Claims, 1 Drawing Sheet

EMBEDDED DATA SIGNALING

The invention relates to signaling of embedded data, and also to the formatting and handling of data streams with embedded data.

The syntax definition of several audio coding schemes/standards (e.g. mp3 and MPEG-AAC, see e.g. ISO/IEC 13818-3 and 13818-7 respectively) provides the possibility of adding ancillary/embedded data to coded audio streams. Compliant decoders are only required to parse the embedded data, not to interpret it. In practice, the embedded data is often used to store a coded data stream related to an enhancement coder/tool (e.g. mp3PRO, MPEG-4 AAC+SBR, wherein "SBR" stands for Spectral Band Replication). Such an enhanced coder/tool can be used on top of the core coder to improve the quality of the core audio stream. Since a non-enhanced coder is required to parse the embedded data, the data embedding is done in backward compatible manner.

In MPEG-4 (see ISO/IEC 14496-1 for MPEG-4 Systems and ISO/IEC 14496-3 for MPEG-4 Audio), signaling of stream content is done by means of descriptors. Each elementary stream (i.e. a consecutive flow of mono-media data such as audio or video which can be packetized) has a corresponding descriptor. The current descriptor definition does not provide for signaling of embedded data. Signaling of the embedded data can of course be realized by means of a corrigendum on the descriptors. However, such a corrigendum cannot be implemented such that the standard remains backward compatible with the current definition. Alternatively, one could use a descriptor in the embedded data itself. This has the disadvantage that the embedded data is not signaled at elementary stream level and that therefore the embedded data needs to be accessed to see what it contains.

An object of the invention is to provide advantageous signaling of embedded data. To this end, the invention provides a method, an encoder, a signal, a storage medium; a method of decoding, a decoder, a transmitter or recorder and a receiver as defined in the independent claims. Advantageous embodiments are defined in the dependent claims.

According to a first aspect of the invention, a signal representing main data is provided, the main data including embedded data, the main data being provided with a main data descriptor for signaling content included in the main data, wherein an embedded data descriptor is formed for signaling content included in the embedded data, and wherein the embedded data descriptor is provided outside (or separate from) the main data and the main data descriptor. By providing the embedded data descriptor outside the main data descriptor, a corrigendum of a currently defined set of main data descriptors is not necessary to take into account non-defined content included in the embedded data; a signal having new embedded data descriptors remains backward compatible as regards the main data and the main data descriptors. By providing the embedded data descriptor outside the main data and thus also outside the embedded data, the main data remains compatible and it is further not necessary to access the embedded data itself to get a description of it.

As a result, elementary streams with embedded data may have two respective descriptors, one for the main data and another for the embedded data.

The main data, the embedded data, the main data descriptor and the embedded data descriptor may all be present in the same transport signal.

Advantageously, the signal is an elementary audio data stream, wherein the embedded data is enhancement data to enhance the audio available in the rest of the elementary data stream. The enhancement data is preferably information suitable for performing spectral band replication. Alternatively, the enhancement data is suitable for extension of the number of channels, e.g. from 1 to 2 channels or from 2 to 5 channels, see e.g. the paper of Faller and Baumgarte, "Binaural cue coding applied to stereo and multi-channel audio compression", *AES* 112$^{th}$ *paper* 5574, May 10-13, 2002, Germany and e.g. European patent application nr. 02076588.9 filed 22 Apr. 2002.

Embodiments of the invention are especially useful in those standards in which it is possible to implement a separate embedded data descriptor such that a conventional coder will not wrongfully use its contents, e.g. by ignoring the embedded data comparator e.g. simply because it uses a non-recognizable code which orders a decoder to ignore the information. Examples of standards where this is easily possible are MPEG-4 systems and RFC 3016.

These and other aspects of the invention will be apparent from the elucidated with reference to the accompanying drawings.

The drawings only show those elements that are necessary to understand the embodiments of the invention.

Figure 1:
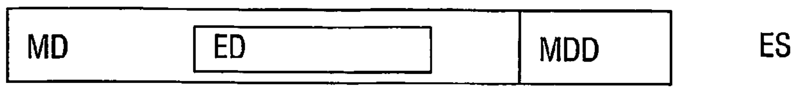
FIG. 1 shows an example of a conventional elementary stream.

FIG. 1 shows an example of a conventional elementary stream ES. The elementary stream ES may be a packetized elementary stream. The elementary stream ES comprises main data MD and a main data descriptor MDD. An exemplary descriptor MDD for an encoded audio stream may be as follows:

```
MDD
{
    Audio object type ("AOT")
    Sampling frequency
    Channel configuration
    AOT specific configuration information
}
```

As an example, configuration information specific to AAC related AOT's include a frame length, i.e. the number of PCM samples per channel related to one AAC audio frame.

Further, the main data MD includes embedded data ED. The main data MD preferably comprises encoded audio data, e.g. AAC or mp3 encoded data. It is also possible that the main data MD comprises video data. The embedded data ED preferably includes enhancement data to enhance the main data MD, e.g. by spectral band replication in the case of audio or by spatial, SNR or other enhancement for video. Alternatively, the enhancement data is suitable for extension of the number of channels, e.g. from 1 to 2 channels or from 2 to 5 channels as indicated above.

In some systems, e.g. in MPEG-4, the data descriptor MDD is not concatenated with the main data MD in the elementary stream, but is provided separately. To determine which descriptor relates to which elementary stream, some identification is used in both the descriptor as well as the elementary stream ES.

The embedded data ED is parsed in a decoder and recognized by an enhanced decoder which is able to use the enhancement data present in ED. Usually, the embedded data ED includes some kind of identification/description to make identification of the enhancement data ED possible, although in proprietary systems it is also possible to agree between an encoder and a decoder that the embedded data ED always comprises enhancement data according to a predetermined format.

Figure 2:
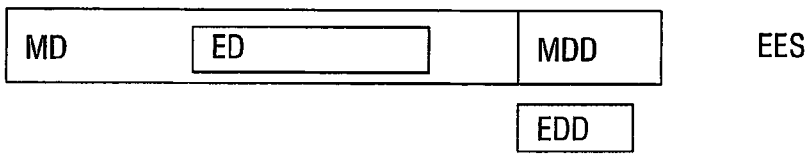
FIG. 2 shows an example of an elementary stream provided with an embedded data descriptor according to an embodiment of the invention.

FIG. 2 shows an example of a further elementary stream EES provided with an embedded data descriptor EDD according to an embodiment of the invention. The embedded data descriptor EDD includes identification information to make identification of the type of embedded data ED possible. The descriptor EDD may also include other useful information. An exemplary descriptor EDD for the data embedded in an encoded audio stream may be as follows:

```
EDD
{
    Audio (enhancement) object type ("AOT")
    AOT specific configuration information
}
```

The definition of the EDD strongly depends on the audio (enhancement) object type. In the case of SBR, it contains the sampling frequency mode, which can be single- or multi-rate. In the case of channel extension, the embedded data descriptor may contain information on the extended channel configuration.

The embedded data descriptor EDD is provided outside the main data MD and the main data descriptor MDD and is therefore easily accessible. Depending on the coding scheme used the data descriptors MDD and EDD may be supplied in a concatenated way with the main data MD. It is also possible to provide the descriptors separately in another part of the signal, e.g. all descriptors grouped together. Some linking information is then necessary to relate the descriptors to the relevant elementary streams.

MPEG4 Implementation

The above described embodiment of the invention is advantageously applied in an MPEG-4 or MPEG-4 like coding scheme. In MPEG4, the main data descriptor MDD and the embedded data descriptor EDD are provided separately with respect to the elementary stream EES. MNEG-4 systems provides tools to relate the descriptors to the relevant elementary streams.

RFC3016 Implementation

In RFC 3016 (IETF RFC 3016: "RTP Payload Format for MPEG-4 Audio/Visual Streams", Kikuchi Y. et al., November 2000), descriptor information is provided as a Session Description Protocol (SDP) parameter. For example in case of audio the audio decoding configuration is described by the parameter "config" as a hexadecimal string that represents the audio descriptor as defined by MPEG-4. An example is given below:

config=000001B001000001B5090000010000000120008440FA282C2090A21F. Another descriptor can be added by defining a new parameter, such as embedded-data-config. Receivers are required to ignore new or unknown parameters.

System According to an Embodiment of the Invention

Figure 3:
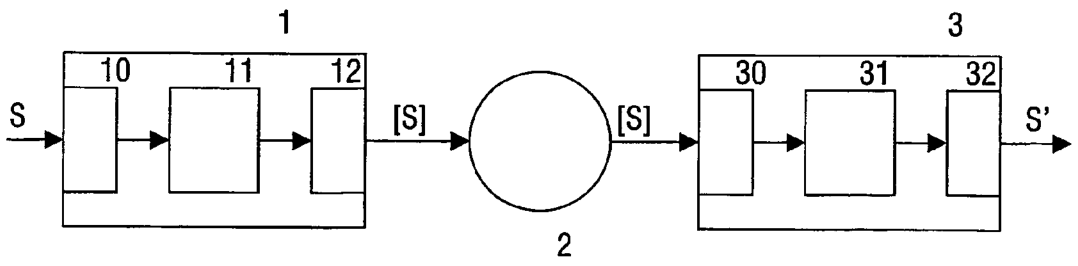
FIG. 3 shows a system according to an embodiment of the invention.

FIG. 3 shows a system according to an embodiment of the invention. The system comprises an apparatus 1 for transmitting or recording an encoded signal [S]. The apparatus 1 comprises an input unit 10 for obtaining an input signal S, e.g. an audio and/or video signal. The input unit 10 may be an antenna, microphone, network connection, etc. The apparatus 1 further comprises an encoder 11 for encoding the signal S according to an above described embodiment of the invention (see in particular FIG. 2) in order to obtain an encoded signal comprising main data MD including embedded data ED, and the descriptors MDD and EDD. The encoded signal is furnished to an output unit 12 which formats the main data MD including the embedded data ED, and the descriptors MDD and EDD into an encoded signal [S] having a suitable format for transmission or storage via a transmission medium or storage medium 2 (e.g. as defined in RFC 3016). The system further comprises a receiver or reproduction apparatus 3 which receives the encoded signal [S] in an input unit 30. The input unit 30 furnishes the main data MD, the embedded data ED and the data descriptors MDD and EDD to the decoder 31. The decoder 31 decodes the encoded signal by performing a decoding process which is substantially an inverse operation of the encoding in the encoder 11 wherein a decoded signal S' is obtained which corresponds to the original signal S except for those parts which were lost during the encoding process. The decoder 31 furnishes the decoded signal S' to a reproduction unit 32 such as a speaker for reproducing the decoded signal S'. The reproduction unit 32 may also be a transmitter for further transmitting the decoded signal S' for example over an in-home network, etc.

Existing receivers are able to ignore the EDD as described above for the RFC 3016 case. Future receiver implementations may be able to interpret the EDD. In this case passing of the EDD to unit 31 may be dependent on the capabilities of unit 31. For example, in those implementations wherein the decoder 31 does not support a feature to which the embedded data relates, then the input unit 30 may decide not to provide the EDD to unit 31 in order to save bandwidth.

Embodiments of the invention may be applied in audio and/or video broadcast, Internet Radio, 3GPP, Internet distribution, Solid State Audio, 3G terminals, GPRS and commercial successors thereof.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. This word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of providing a signal within an elementary data stream to be encoded via an encoder, the signal representing main data, the main data including embedded data, the main data being provided with a main data descriptor for signaling content included in the main data, the method comprising:

forming, via the encoder, an embedded data descriptor configured to identify content included in the embedded data; and providing, via the encoder, the embedded data descriptor within the elementary data stream outside (i) the main data including the embedded data and (ii) the main data descriptor of the elementary data stream, wherein the embedded data content comprises enhancement data configured to enhance the main data available in the elementary data stream during a reproduction of the main data by a reproduction unit in response to the reproduction unit being configured to recognize and interpret the embedded data descriptor, else the reproduction unit ignores the embedded data descriptor.

2. The method as claimed in claim 1, wherein the main data comprises audio and/or video data available in the elementary data stream and wherein the embedded data comprises enhancement data for enhancing the audio and/or video data available in the elementary data stream.

3. An encoder for providing a signal within an elementary data stream, the signal representing main data, the main data including embedded data, the main data being provided with a main data descriptor for signaling content included in the data, the encoder comprising:

means for forming an embedded data descriptor configured to identify content included in the embedded data; and means for providing the embedded data descriptor within the elementary data stream outside (i) the main data including the embedded data and (ii) the main data descriptor of the elementary data stream, wherein the embedded data content comprises enhancement data configured to enhance the main data available in the elementary data stream during a reproduction of the main data by a reproduction unit in response to the reproduction unit being configured to recognize and interpret the embedded data descriptor, else the reproduction device ignores the embedded data descriptor.

4. A storage medium having stored thereon a packetized elementary data stream for execution by a reproduction device, after being received in an input unit of the reproduction device, for causing the reproduction device to reproduce main data of the packetized elementary data stream, the elementary data stream having been encoded with a signal via an encoder, the signal representing main data, the main data including embedded data, the main data being provided with a main data descriptor for signaling content included in the main data, the packetized elementary data stream further including an embedded data descriptor configured to identify content included in the embedded data, wherein the embedded data descriptor is provided within the packetized elementary data stream outside (i) the main data including the embedded data and (ii) the main data descriptor of the elementary data stream, wherein the embedded data content comprises enhancement data configured to enhance the main data available in the elementary data stream during reproduction of the main data by the reproduction device in response to the reproduction device being configured to recognize and interpret the embedded data descriptor, else the reproduction device ignores the embedded data descriptor.

5. A method of decoding a signal within an elementary data stream via a decoder, the signal representing main data, the main data including embedded data, the main data being provided with a main data descriptor for signaling content included in the main data, the elementary data stream being provided with an embedded data descriptor configured to identify content included in the embedded data, wherein the embedded data descriptor is provided within the elementary data stream outside (i) the main data including the embedded data and (ii) the main data descriptor of the elementary data stream, the decoding method comprising the steps of:

reading, via the decoder, the embedded data descriptor of the elementary data stream; and using the embedded data included in the main data in dependence on the reading of the embedded data descriptor, wherein the embedded data content comprises enhancement data configured to enhance the main data available in the elementary data stream during reproduction of the main data by a reproduction unit in response to the reproduction unit being configured to recognize and interpret the embedded data descriptor, else the reproduction unit ignores the embedded data descriptor.

6. A decoder for decoding a signal within an elementary data stream, the signal representing main data, the main data including embedded data, the main data being provided with a main data descriptor for signaling content included in the main data, the elementary data steam being provided with an embedded data descriptor configured to identify content included in the embedded data, wherein the embedded data descriptor is provided within the elementary data stream outside (i) the main data including the embedded data and (ii) the main data descriptor of the elementary data stream, the decoder comprising:

means for reading the embedded data descriptor of the elementary data stream; and means for using the embedded data included in the main data in dependence on the reading of the embedded data descriptor, wherein the embedded data content comprises enhancement data configured to enhance the main data available in the elementary data stream during reproduction of the main data by a reproduction unit in response to the reproduction unit being configured to recognize and interpret the embedded data descriptor, else the reproduction unit ignores the embedded data descriptor.

7. A transmitter or recorder comprising:

an input unit for obtaining an input signal;

an encoder to encode the input signal within an elementary data stream to obtain main data, the main data including embedded data, the main data being provided with a main data descriptor for signaling content included in the main data, the embedded data being provided with an embedded data descriptor configured to identify content included in the embedded data, wherein the embedded data descriptor is provided outside the main data and the main data descriptor, further wherein the encoder comprises means for forming the embedded data descriptor for signaling content included in the embedded data, and means for providing the embedded data descriptor within the elementary data stream outside (i) the main data including the embedded data and (ii) the main data descriptor of the elementary data stream, wherein the embedded data content comprises enhancement data configured to enhance the main data available in the elementary data stream during a reproduction of the main data by a reproduction unit in response to the reproduction unit being configured to recognize and interpret the embedded data descriptor, else the reproduction unit ignores the embedded data descriptor; and an output unit for formatting the main data including the embedded data, the main data descriptor, and the embedded data descriptor into an encoded signal within the elementary data stream and for transmitting or recording the encoded signal.

8. A receiver comprising:

an input unit for obtaining a signal within an elementary data stream, the signal representing main data, the main data including embedded data, the main data being provided with a main data descriptor for signaling content included in the main data, the elementary data stream being provided with an embedded data descriptor configured to identify content included in the embedded data, wherein the embedded data descriptor is provided within the elementary data stream outside (i) the main data including the embedded data and (ii) the main data descriptor of the elementary data stream;

a decoder for decoding the signal to obtain a decoded signal, wherein the decoder comprises means for reading the embedded data descriptor of the elementary data stream, and means for using the embedded data included in the main data in dependence on the reading of the embedded data descriptor, wherein the embedded data content comprises enhancement data configured to enhance the main data available in the elementary data stream during reproduction of the main data in response to the decoder being configured to support a feature to which the embedded content relates, else the decoder ignores the embedded data descriptor; and an output unit for reproducing the decoded signal.

9. The method of claim 1, wherein the main data includes audio data and wherein the enhancement data comprises information suitable for performing spectral band replication of the audio data of the main data available in the elementary data stream.

10. The method of claim 1, wherein the main data includes audio data and wherein the enhancement data comprises information suitable for extension of a number of channels of the audio data of the main data available in the elementary data stream.

11. The encoder of claim 3, wherein the main data includes audio data and wherein the enhancement data comprises information suitable for performing spectral band replication of the audio data of the main data available in the elementary data stream.

12. The encoder of claim 3, wherein the main data includes audio data and wherein the enhancement data comprises information suitable for extension of a number of channels of the audio data of the main data available in the elementary data stream.

13. The method of claim 5, wherein the main data includes audio data and wherein the enhancement data comprises information suitable for performing spectral band replication of the audio data of the main data available in the elementary data stream.

14. The method of claim 5, wherein the main data includes audio data and wherein the enhancement data comprises information suitable for extension of a number of channels of the audio data of the main data available in the elementary data stream.

15. The decoder of claim 6, wherein the main data includes audio data and wherein the enhancement data comprises information suitable for performing spectral band replication of the audio data of the main data available in the elementary data stream.

16. The decoder of claim 6, wherein the main data includes audio data and wherein the enhancement data comprises information suitable for extension of a number of channels of the audio data of the main data available in the elementary data stream.

* * * * *